(12) United States Patent
Ryu et al.

(10) Patent No.: US 9,385,399 B2
(45) Date of Patent: Jul. 5, 2016

(54) SECONDARY BATTERY EMPLOYING SAFETY DEVICE

(75) Inventors: Ji Heon Ryu, Seoul (KR); Jin Woong Ha, Cheonan-si (KR); Jeong Hee Choi, Nam-gu Busan (KR); Youngjoon Shin, Yuseong-gu Daejeon (KR)

(73) Assignee: LG Chem, Ltd. (KR)

( * ) Notice: Subject to any disclaimer, the term of this patent is extended or adjusted under 35 U.S.C. 154(b) by 1743 days.

(21) Appl. No.: 11/517,089

(22) Filed: Sep. 7, 2006

(65) Prior Publication Data

US 2007/0054157 A1    Mar. 8, 2007

(30) Foreign Application Priority Data

Sep. 7, 2005    (KR) .................. 10-2005-0083084

(51) Int. Cl.
*H01M 10/42* (2006.01)
*H01M 2/34* (2006.01)

(52) U.S. Cl.
CPC ............ *H01M 10/42* (2013.01); *H01M 2/34* (2013.01)

(58) Field of Classification Search
CPC ............. H01M 2200/00; H01M 2200/20; H01M 2/34; H01M 2/20; H01M 2/347; H01M 10/5026; H01M 2006/50; H01M 2200/103; H01M 2200/108
USPC ......... 429/7, 61, 99, 123, 149, 151–154, 178; 29/623.1–623.5
See application file for complete search history.

(56) References Cited

U.S. PATENT DOCUMENTS 5,738,952 A    4/1998   Abe
5,800,937 A  * 9/1998   Decker et al. .............. 429/7

(Continued)

FOREIGN PATENT DOCUMENTS

JP    60221950 A  * 11/1985  .......... H01M 2/02
JP    2001-243991       9/2001
(Continued)

OTHER PUBLICATIONS

Abstract in English of JP 60-221950.*
(Continued)

*Primary Examiner* — Sarah A Slifka
(74) *Attorney, Agent, or Firm* — Lerner, David, Littenberg, Krumholz & Mentlik, LLP

(57) ABSTRACT

Disclosed herein is a secondary battery having a mechanical connection sensor, as a safety device, fixed to the outer surface of a prismatic or pouch-shaped battery cell while the mechanical connection sensor is set to OFF. The mechanical connection sensor is connected in series with a resistor having a predetermined resistance value and with a cathode and an anode of the battery cell. When the battery cell swells to a critical value or more due to the abnormal operation of the battery cell, the mechanical connection sensor is turned ON, and therefore, the mechanical connection sensor conducts with the result that the electrical energy of the battery cell is consumed at the resistor. In the secondary battery having the safety device according to the present invention, when the battery swells due to the abnormal response of the battery, energy accumulated in the battery is forcibly consumed, unlike a conventional battery that merely intercepts the current. As a result, the continuous occurrence of the abnormal response is fundamentally prevented, and therefore, more rapid process is possible with excellent pressure sensitivity. Consequently, the safety of the battery is improved.

10 Claims, 6 Drawing Sheets

(56) References Cited

U.S. PATENT DOCUMENTS

| | | | |
|---|---|---|---|
| 6,225,778 B1 * | 5/2001 | Hayama et al. | 320/112 |
| 6,818,343 B1 * | 11/2004 | Kimoto et al. | 429/99 |
| 2003/0027036 A1 * | 2/2003 | Emori et al. | 429/61 |
| 2005/0255376 A1 * | 11/2005 | Cho et al. | 429/61 |
| 2006/0093896 A1 * | 5/2006 | Hong et al. | 429/61 |
| 2006/0246348 A1 * | 11/2006 | Hamada et al. | 429/148 |

FOREIGN PATENT DOCUMENTS

| | | |
|---|---|---|
| JP | 2003-231319 | 9/2003 |
| JP | 2004-319463 | 11/2004 |

OTHER PUBLICATIONS

SatCure-Focus.com (Jul. 2001; http://www.satcure-focus.com/tutor/page2.htm).*

* cited by examiner

SECONDARY BATTERY EMPLOYING SAFETY DEVICE

FIELD OF THE INVENTION

The present invention relates to a secondary battery having a safety device, and, more particularly, to a secondary battery having a mechanical connection sensor, as a safety device, fixed to the outside of a battery cell for detecting the pressure of the battery cell, wherein the mechanical connection sensor is connected with a resistor and terminals of the battery cell, and, when the inner pressure of the battery cell is increased due to the abnormal operation of the battery cell, and therefore, the battery cell swells, the mechanical connection sensor is operated such that electrical energy accumulated in the battery cell is forcibly consumed at the resistor, whereby the energy of the battery cell is decreased, and therefore, the explosion of the battery cell is prevented.

BACKGROUND OF THE INVENTION

As the use of portable electronic devices, such as laptop computers, mobile phones, video cameras, digital cameras, etc., has been increased, the demand of secondary batteries having high energy density that are used as power sources of the portable electronic devices has been increased. In addition, the demand of secondary batteries for electric vehicles has also been increased: One of the secondary batteries is a lithium-ion battery including anodes made of a carbonaceous material, cathodes made of lithium metal oxide, separators made of polyolefin, and an electrolyte.

However, the lithium-ion secondary battery has a high operating potential. As a result, high energy may instantaneously flow, and therefore, chemical activity is greatly increased due to overcharge or short circuits. Consequently, a large amount of gas is generated due to abrupt response with the electrolyte. As a result, the inner pressure or the inner temperature of the battery is abruptly increased, and therefore, when the battery explodes, apparatuses adjacent to the battery may be damaged, or a human body may be injured.

For this reason, various safety devices to prevent the explosion of the lithium-ion secondary battery are mounted in the lithium-ion secondary battery. For example, U.S. Pat. No. 5,738,952 discloses a structure in which a safety plate and a cathode lead tap are connected with each other by welding, and, when the inner pressure of a battery reaches a predetermined critical pressure level, the safety plate is turned over, and therefore, the welding region between the safety plate and the cathode lead tap is broken to intercept current, thereby preventing the increase of the pressure and the temperature of the battery. Consequently, when the inner pressure of the battery reaches the predetermined pressure level, the current flow route is intercepted, and therefore, the increase of the pressure is prevented. In the conventional art, the safety plate is mounted at the outside of the battery. Consequently, the current flow at the outside of the battery is intercepted when the abnormal response of the battery occurs. However, energy has already been accumulated in the battery, and therefore, the battery may explode when overcharge is continuously performed or when the inner temperature of the battery increases.

In addition, there have been proposed a technology for melting a heat fuse, when a battery cell swells, to accomplish a short circuit of the battery cell (Japanese Unexamined Patent Publication No. 2003-231319) and a technology for actuating an intercepting switch, when a battery cell swells, to intercept current. According to these technologies, however, energy has also been accumulated in the battery cell. Consequently, the battery cell may explode when overcharge is continuously performed or when the inner temperature of the battery cell increases.

As a method to solve the above-mentioned problems, there has been proposed a technology for discharging a battery cell based on a signal from a pressure detection means (a pressure-sensitive resistor) for detecting the swelling of the battery cell (Japanese Unexamined Patent Publication No. 2001-243991). According to this method, when the battery cell swells due to overcharge, the pressure of the battery cell is detected to drive a FET. That is to say, the FET is driven by the operation of a circuit, and therefore, such a function must be additionally included in the circuit. When the circuit is abnormally operated, however, the safety device is not operated. Consequently, when the battery is exposed to high temperature or the battery is overdischarged due to the abnormality of the circuit, the normal operation of the safety device through the circuit is not guaranteed.

As another method of consuming electrical energy accumulated in a battery cell through a discharge resistor, there has been proposed a structure in which a conducting member is spaced a predetermined distance from a battery case, which is also used as an electrode terminal (+), the conducting member being connected to another electrode terminal (−), and, when the battery case swells, the conducting member and the battery case are brought into contact with each other, whereby a short circuit occurs, and therefore, the battery cell is discharged (Japanese Unexamined Patent Publication No. 2004-319463). However, this method has disadvantages in that the battery case is used as the electrode terminal, i.e., the construction of the battery is restricted, and reliable operational characteristics are not provided.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention found that, when a mechanical connection sensor, which is operated by pressure, is mounted at the outer surface of a battery cell, and the mechanical connection sensor is connected to electrode terminals of the battery cell and a resistor having an appropriate resistance condition, a switch of the mechanical connection sensor is turned ON if the inner pressure of the battery cell is excessively increased, and therefore, a short circuit of the battery cell occurs, and therefore, discharge of the battery cell occurs at the resistor, whereby the energy of the battery cell is effectively decreased. The present invention has been completed based on these findings.

In accordance with one aspect of the present invention, the above and other objects can be accomplished by the provision of a secondary battery having a mechanical connection sensor fixed to the outer surface of a prismatic or pouch-shaped battery cell while the mechanical connection sensor is set to OFF, wherein the mechanical connection sensor is connected in series with a resistor having a predetermined resistance value and with a cathode and an anode of the battery cell, whereby, when the battery cell swells to a critical value or more due to the abnormal operation of the battery cell, the mechanical connection sensor is turned ON, and therefore, the mechanical connection sensor conducts with the result that the electrical energy of the battery cell is consumed at the resistor.

According to the present invention with the above-stated construction, when the abnormality of the battery occurs, the battery can be rapidly and sensitively operated by the mechanical connection sensor with high reliability. In addition, the discharging operation is not realized through a circuit. Consequently, the safety device can be operated even when the circuit malfunctions. Furthermore, no additional function is necessary in a circuit related to the operation of the battery. Consequently, the present invention has an economical advantage.

The secondary battery according to the present invention is related to a prismatic battery cell or a pouch-shaped battery cell, the volume change of which is large when the battery cell swells and in which it is difficult to include a safety device. The prismatic battery cell is a battery having an electrode assembly mounted in a prismatic case, specifically, a hexahedral case, and the pouch-shaped battery cell is a battery having an electrode assembly mounted in a pouch-shaped laminate sheet including a resin layer and a metal layer.

According to the present invention, the mechanical connection sensor is fixed to the outer surface of such a battery cell. The mechanical connection sensor is a sensor that can be mechanically operated depending upon the volume change of the battery cell. The mechanical connection sensor is not particularly restricted so long as the mechanical connection sensor can be reliably turned from an OFF state to an ON state when the volume of the battery cell is increased.

In a preferred embodiment, the mechanical connection sensor has two connection terminals spaced vertically apart from each other and mounted in a pressure-sensitive sheath. According to the present invention, the mechanical connection sensor, which is fixed to the outer surface of the battery cell while the mechanical connection sensor is set to the OFF state, is turned to the ON state, when the battery cell swells, and therefore, the mechanical connection sensor conducts. In the above-mentioned preferred structure, the pressure-sensitive sheath is pressed, when the battery cell swells, whereby the connection terminals are brought into contact with each other. When the battery cell contracts due to various reasons, on the other hand, the mechanical connection sensor is returned to the OFF state, and therefore, the electrical conduction is interrupted.

In order that the mechanical connection sensor is turned from the OFF state to the ON state in precise consideration of swelling of the battery cell inducing the electrical conduction, the two connection terminals in the mechanical connection sensor may be spaced apart from each other in various fashions. Preferred examples are as follows.

In a first structure example, an elastic member, such as a compression spring, may be mounted between the connection terminals. Specifically, one end of the elastic member may be fixed to the pressure-sensitive sheath, and one of the connection terminals may be elastically supported by the other end of the elastic member (see FIG. 5). Alternatively, one of the connection terminals may have one or more protruding connection ends, and the two connection terminals may be elastically supported by the elastic member, which is disposed between the connection terminals (see FIG. 7). Consequently, the two connection terminals remain spaced apart from each other (OFF state) by the elastic member, and, when the battery cell swells, the elastic member is compressed. As a result, the two connection terminals are brought into contact with each other, and therefore, the electrical conduction (On state) is accomplished.

In a second structure example, the connection terminals may be spaced apart from each other by a film-shaped insulative member disposed between the connection terminals, at least one of the connection terminals may be provided with a conductive piercing member for piercing the insulative member and connecting with the other connection terminal when an external force (a swelling force of the battery cell) is applied to the at least one of the connection terminals (see FIG. 9). Consequently, when the external force is applied, the conductive piercing member pierces the insulative member, whereby the electrical conduction (ON state) is accomplished.

In a third structure example, at least one of the connection terminals may be formed of a material or a shape that can be deformed due to an external force, and at least two insulators may be mounted between the two connection terminals such that the at least two insulators are spaced apart from each other (see FIGS. 11 and 13). Consequently, the connection terminals remain spaced apart from each other (OFF state) by the at least two insulators, and, when an external force due to the swelling of the battery cell is applied, at least one of the connection terminals is deformed in a space defined between the at least two insulators. As a result, the two connection terminals are brought into contact with each other, and therefore, the electrical conduction (On state) is accomplished.

Although some preferred examples were illustrated in the above description, it should be noted that other various structures are possible according to the present invention.

Preferably, the mechanical connection sensor is mounted at the middle of the battery cell, at which the volume change of the battery cell is the maximum when the battery cell swells.

Also, the size of the mechanical connection sensor is not particularly restricted. Preferably, the mechanical connection sensor has a size in which the mechanical connection sensor can sensitively respond to the swelling of the battery cell, and unintentional conduction due to the weight of the battery cell is prevented.

The swelling of the battery cell causing the operation of the mechanical connection sensor may be set to various conditions. In the above-mentioned preferred examples, the swelling of the battery cell may be decided based on the mechanical strength of the pressure-sensitive sheath and the distance between the connection terminals.

The resistor serves to consume the energy of the battery cell through the generation of heat when the mechanical connection sensor conducts. Since an excessive amount of electrical energy accumulated in the battery cell must be consumed through the conduction, a large amount of heat may be generated from the resistor. Consequently, heat generated from electric current flowing during the forcible discharge of the battery cell must be effectively emitted, and therefore, the resistor is preferably mounted at a region outside of the battery cell where the effect due to the heat generation is minimized. The region may be the lower end of the battery cell. According to circumstances, the resistor may be mounted at a region spaced apart from the battery cell.

According to the present invention, the resistance value of the resistor may be adjusted to control the degree of forcible discharge. The resistance value of the resistor may be decided within a range in which the resistance value is greater than the sum of the resistances of a wire and the connection sensor used to connect the resistor, and, at the same time, is not excessive. When the resistance value is too small, flames may occur due to excessively rapid discharge, or extreme heat generation causing fire may occur. When the resistance value is too large, on the other hand, the discharge speed is decreased, and therefore, the safety is deteriorated.

In a preferred embodiment, the resistance value may be set based on the capacity and voltage of the battery such that the total capacity of the battery can be discharged in approximately 10 seconds, at shortest, and in approximately 10 hours, at longest. Consequently, the usable range of the resistance value may be changed depending upon the voltage and the capacity of the battery.

For example, the resistance value may be set such that discharge is accomplished with a current of between 720 A and 0.2 A so as to mount the safety device according to the present invention to a battery having 4 V/2 Ah. Preferably, the total resistance value including the resistances of the resistor, the connection sensor, and the wire may have a range of 5 mΩ to 20 mΩ. More preferably, the resistance value may be set such that the discharge is accomplished in approximately 1 minute to 2 hours. In this case, a current of 120 A to 1 A flows, and the total resistance value is preferably set to a range of 33 mΩ to 4 Ω. In addition, it is necessary to set the resistance values of the connection sensors and the wire such that the resistance values of the connection sensors and the wire are a half of or less than the resistance value of the resistor.

The secondary battery may be used in either a small-sized battery pack having a single battery cell mounted in a pack case or a medium- or large-sized battery pack having a plurality of secondary batteries, as unit cells, mounted in a pack case while the secondary batteries are stacked one on another with high density. Preferably, the secondary battery may be used in a medium- or large-sized battery pack having a serious safety problem due to the swelling of the secondary battery.

In accordance with another aspect of the present invention, there is provided a medium- or large-sized battery pack including a secondary battery having the above-described safety device as a unit cell.

In the medium- or large-sized battery pack, the mechanical connection sensor may be mounted between the pack case and the corresponding battery cell, between the battery cells, or between another member (a frame member) and the corresponding battery cell.

Although a single mechanical connection sensor is mounted at the outer surface of a single battery cell, two or more mechanical connection sensors may be mounted at the outer surface of a single battery cell such that the mechanical connection sensors are connected in parallel with each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
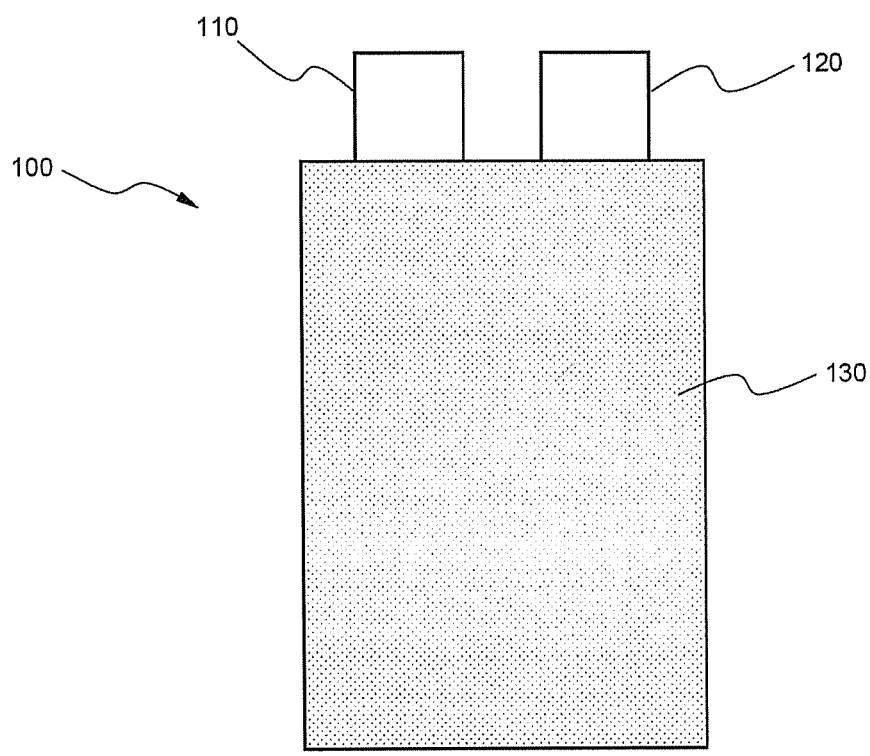
FIG. 1 is a typical view illustrating the external appearance of a pouch-shaped secondary battery according to a preferred embodiment of the present invention.

FIG. 1 is a typical view illustrating the external appearance of a pouch-shaped battery cell 100 according to a preferred embodiment of the present invention. Referring to FIG. 1 the battery cell 100 is constructed in a structure in which an electrode assembly (not shown) is mounted in a pouch-shaped battery case 130, and a cathode tap 110 and an anode tap 120 protrude from the upper end of the battery case 130. The pouch-shaped battery case 130 is constructed in a laminate sheet structure including a metal layer and a resin layer and having an insulative outer surface. Consequently, when the inner pressure of the battery cell 100 is increased, the battery cell 100 easily swells.

Figure 2:
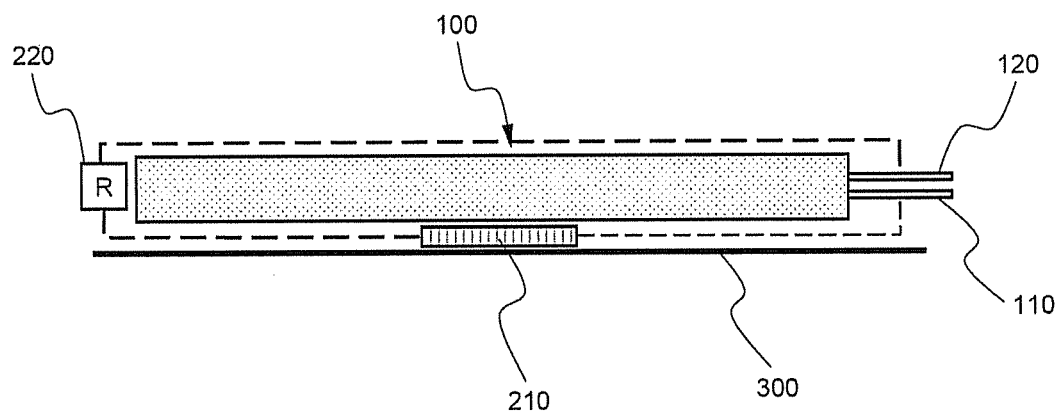
FIG. 2 is a sectional view typically illustrating a structure in which a mechanical connection sensor is mounted between a unit cell and a pack case according to a preferred embodiment of the present invention.
Figure 3:
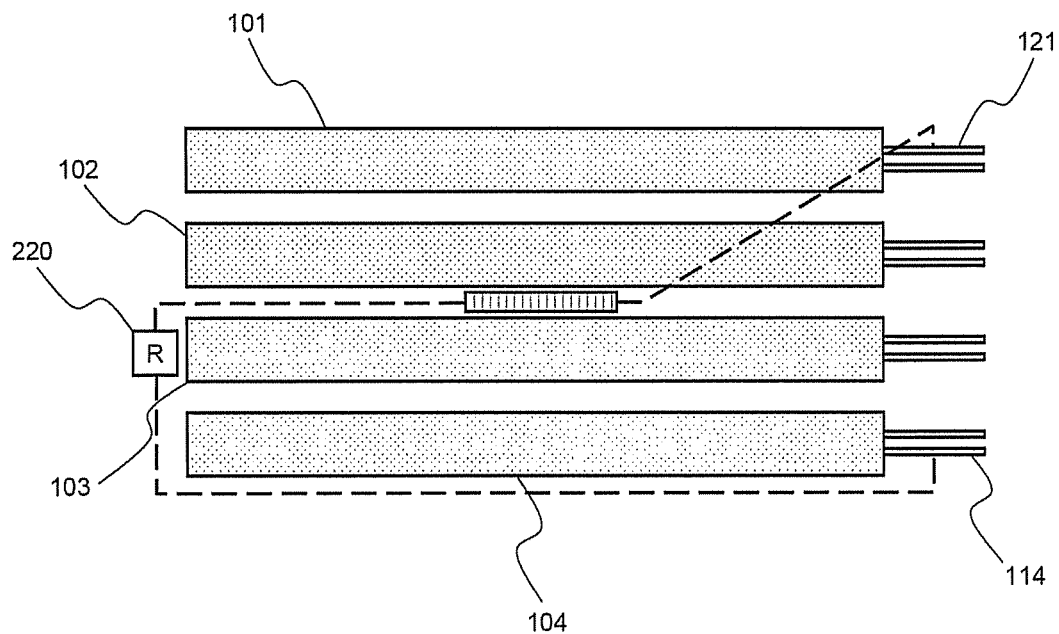
FIG. 3 is a sectional view typically illustrating a structure in which a mechanical connection sensor is mounted between two unit cells of a medium- or large-sized battery pack including a plurality of secondary batteries stacked one on another as unit cells for high output and large capacity according to another preferred embodiment of the present invention.

FIGS. 2 and 3 are sectional views illustrating a safety device mounted to the battery cell for forcibly discharging the battery cell based on the pressure detection according to a preferred embodiment of the present invention. Specifically, FIG. 2 is a sectional view typically illustrating a structure in which a mechanical connection sensor is mounted between a unit cell and a pack case, and FIG. 3 is a sectional view typically illustrating a structure in which a mechanical connection sensor is mounted between two unit cells of a battery pack including a plurality of secondary batteries stacked one on another as unit cells and mounted in a pack case for high output and large capacity.

Referring first to FIG. 2 opposite ends of a mechanical connection sensor 210 are connected in series with a cathode 110 and an anode 120 of a battery cell 100. Between the anode 120 and the mechanical connection sensor 210 is also connected a resistor 220. The connection sensor 210 is mounted in a space defined between the battery cell 100 and a pack case 300, and therefore, when the battery cell 100 swells, one side surface of the connection sensor 210 is pressed by the battery case 100 while the other side surface of the connection sensor 210 is supported by the pack case 300.

Referring to FIG. 3, a plurality of secondary batteries 101, 102, 103, and 104 are sequentially stacked one on another as unit cells, and a mechanical connection sensor 210 is mounted between the unit cells 102 and 103. One end of the mechanical connection sensor 210 is connected to an anode terminal 121 of the first unit cell 101, and the other end of the mechanical connection sensor 210 is connected to a cathode terminal 114 of the fourth unit cell 104. Between the cathode terminal 114 and the mechanical connection sensor 210 is also connected a resistor 220. Consequently, when one of the unit cells 101, 102, 103, and 104 swells, the mechanical connection sensor 210 conducts, and therefore, the total electric energy of the battery pack is consumed through the resistor 220.

The mechanical connection sensor 210 may be selectively mounted in the spaces defined between the respective unit cells 101, 102, 103, and 104 or in the spaces defined between some of the unit cells. The mechanical connection sensor 210 may be connected in series with the cathode and the anode of any unit cell so long as the mechanical connection sensor 210 conducts, when the unit cells swell, and therefore, the electric energy is consumed. In the case that the unit cells sequentially stacked one on another are connected in parallel with each other, the same effect is accomplished even though the mechanical connection sensor is connected to the electrodes of any unit cells. In the case that the unit cells sequentially stacked one on another are connected in series with each other, it is preferable that the mechanical connection sensor be connected to the cathode and the anode of the unit cells disposed at the opposite ends of the series connection so as to consume the total energy of the unit cells.

Figure 4:
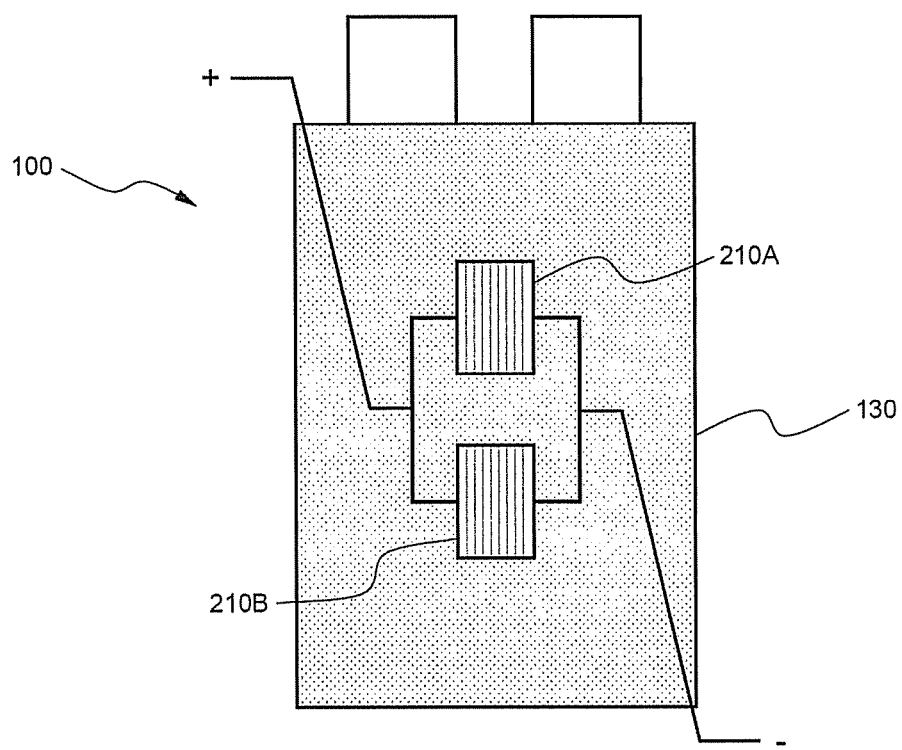
FIG. 4 is a typical view illustrating a structure in which two mechanical connection sensors are mounted at the outer surface of the unit cell according to another preferred embodiment of the present invention.

FIG. 4 is a typical view illustrating a structure in which two mechanical connection sensors are mounted at the outer surface of the battery cell according to another preferred embodiment of the present invention.

Referring to FIG. 4 two mechanical connection sensors 210A and 210B are mounted at the middle surface of a battery case 130 of a battery cell 100 such that the two mechanical connection sensors 210A and 210B are in parallel with each other. Specifically, the two mechanical connection sensors 210A and 210B are connected in parallel with each other. Consequently, when the battery cell 100 swells, the electrical conduction is achieved even though any one of the mechanical connection sensors 210A and 210B is normally operated, and therefore, this structure has high sensitivity.

The mechanical connection sensors 210A and 210B may be disposed such that the mechanical connection sensors 210A and 210B are perpendicular to each other or may be disposed such that the mechanical connection sensors 210A and 210B are at an angle to each other. Alternatively, one of the mechanical connection sensors 210A may be disposed at the middle of the battery case 130, and the other mechanical connection sensor 210B may be disposed at the outer circumference of the battery case 130 while the mechanical connection sensor 210B is spaced a predetermined distance from the mechanical connection sensor 210A. According to circumstances, the mechanical connection sensor 210B may be disposed at the rear surface of the battery case 130.

FIGS. 5 to 14 are sectional views typically illustrating the operations of various mechanical connection sensors from an OFF state to an ON state when pressure is generated in a battery according to the present invention, and therefore, the volume of the battery increases.

Figure 5:
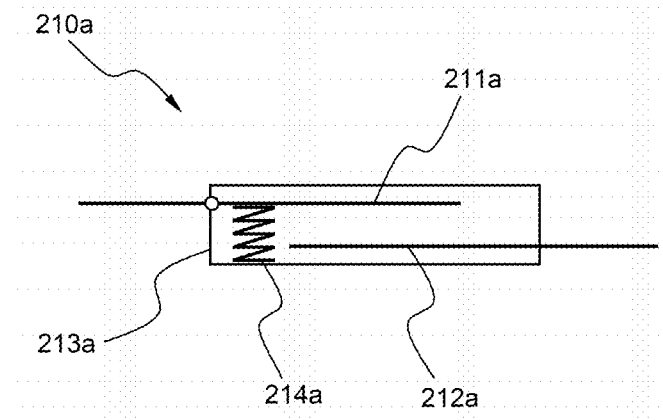
FIGS. 5 and 6 are sectional views typically illustrating the operation of an exemplary mechanical connection sensor (a) that can be used in the present invention.
Figure 6:
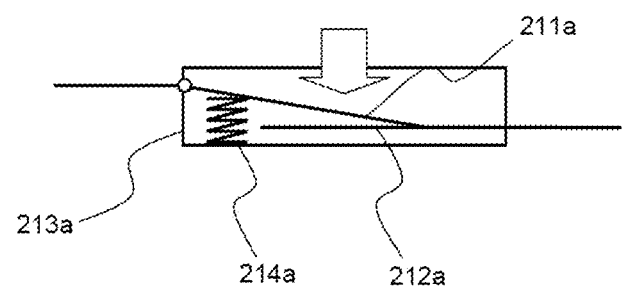

Referring first to FIGS. 5 and 6, a mechanical connection sensor 210a is constructed in a structure in which two connection terminals 211a and 212a, which are spaced vertically apart from each other, are mounted in a pressure-sensitive sheath 213a.

The mechanical connection sensor 210a is constructed in the form of a switch to detect pressure. When overcharge occurs in the battery cell, or the temperature of the battery cell is increased to a high temperature level due to an external heat source, gas is generated in the battery cell, and therefore, the battery cell swells. When abnormality occurs in the battery cell, and therefore, the volume of the battery cell increases, the pressure-sensitive sheath 213a of the mechanical connection sensor 210a is compressed by the pressure of the battery cell. As a result, the two connection terminals 211a and 212a, which are spaced vertically apart from each other, are brought into contact with each other to achieve the electrical conduction.

In order that the mechanical connection sensor 210a is turned from an OFF state to an ON state in precise consideration of swelling of the battery cell inducing the electrical conduction, a compression spring 214a, as an elastic member, is mounted between the connection terminals 211a and 212a.

Specifically, one end of the compression spring 214a is fixed to the pressure-sensitive sheath 213a, and the upper connection terminal 211a is elastically supported by the other end of the compression spring 214a. Consequently, the connection terminals 211a and 212a remain spaced apart from each other (OFF state) by the compression spring 214a. When the battery cell swells, however, the compression spring 214a is compressed, and therefore, the connection terminals 211a and 212a are brought into contact with each other with the result that the electrical conduction is achieved (ON state).

Figure 7:
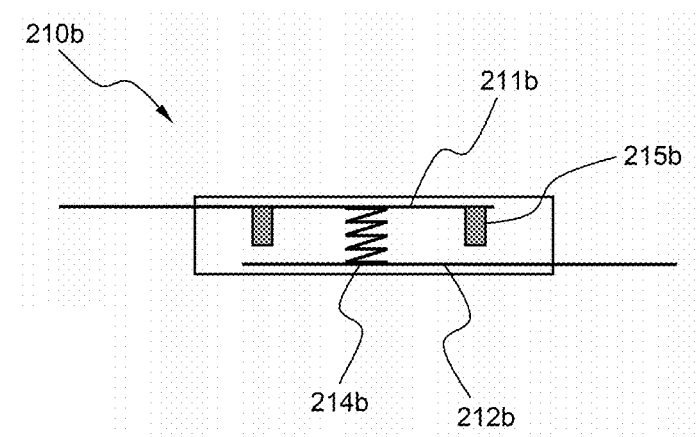
FIGS. 7 and 8 are sectional views typically illustrating the operation of an exemplary mechanical connection sensor (b) that can be used in the present invention.
Figure 8:
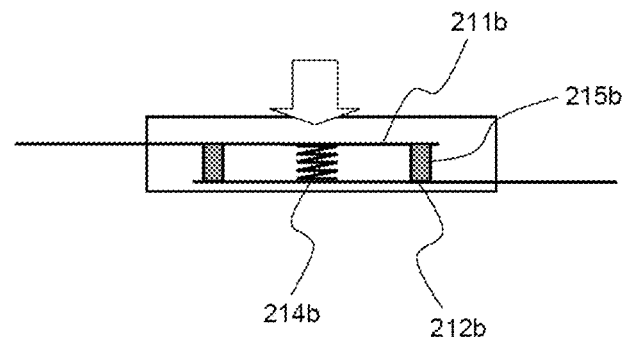

Referring to FIGS. 7 and 8, a mechanical connection sensor 210b is different from the mechanical connection sensor 210a of FIG. 5 in that two connection terminals 211b and 212b are elastically supported by a compression spring 214b connected between the connection terminals 211b and 212b, and two protruding connection ends 215b are formed at the upper connection terminal 211b.

Figure 9:
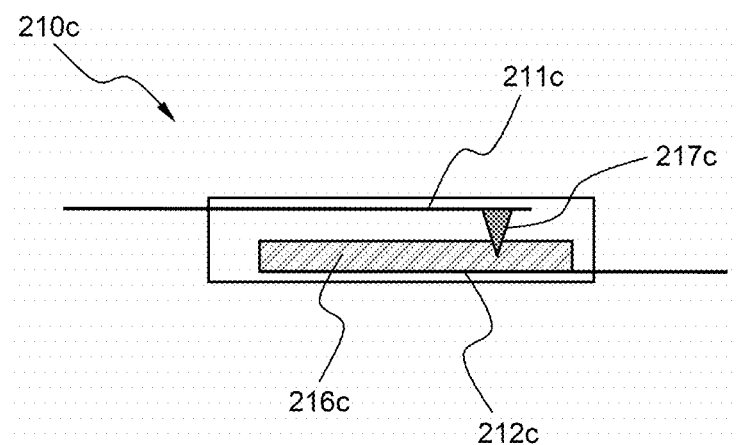
FIGS. 9 and 10 are sectional views typically illustrating the operation of an exemplary mechanical connection sensor (c) that can be used in the present invention.
Figure 10:
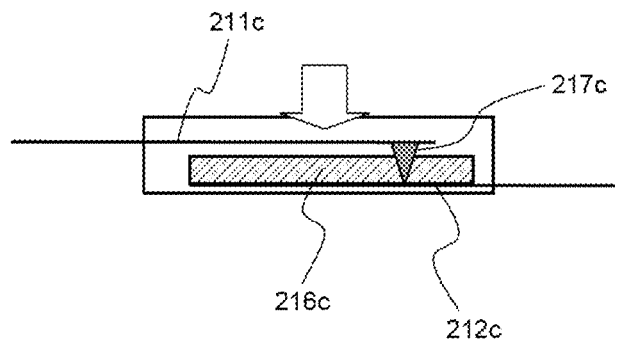

Referring to FIGS. 9 and 10, a mechanical connection sensor 210c is constructed in a structure in which connection terminals 211c and 212c are spaced apart from each other by an insulative thick film 216c disposed between the connection terminals 211c and 212c, the upper connection terminal 211c is provided with a conductive piercing member 217c for piercing the insulative thick film 216c and connecting with the lower connection terminal 212c when an external force is applied to the upper connection terminal 211c due to the swelling of the battery cell. Consequently, when the external force is applied, the conductive piercing member 217c pierces the insulative thick film 216c, and therefore, the mechanical connection sensor 210c is turned ON, i.e., conducts.

Figure 11:
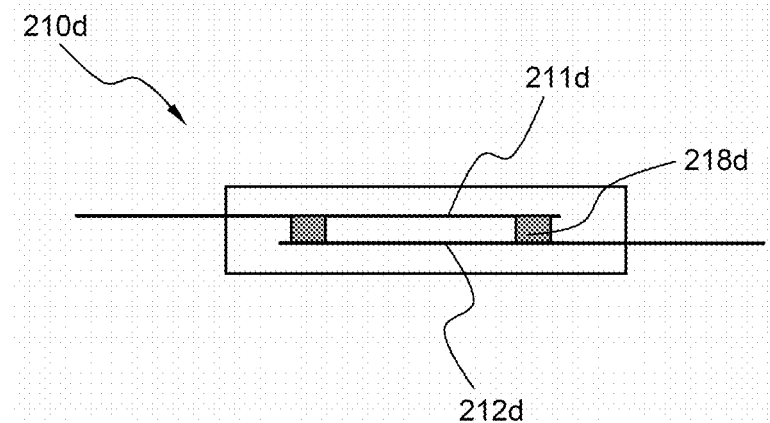
FIGS. 11 and 12 are sectional views typically illustrating the operation of an exemplary mechanical connection sensor (d) that can be used in the present invention.
Figure 12:
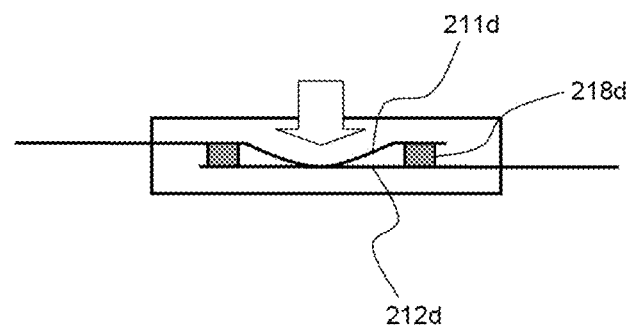

Referring to FIGS. 11 and 12, a mechanical connection sensor 210d is constructed in a structure in which two insulators 218d are mounted between upper and lower connection terminals 211d and 212d such that the insulators 218d are spaced apart from each other. The upper connection terminal 211d is made of a material that can be deformed due to an external force. Consequently, the upper and lower connection terminals 211d and 212d remain spaced apart from each other (OFF state) due to the two insulators 218d, which are spaced apart from each other. When an external force due to the swelling of the battery cell is applied, however, the upper connection terminal 211d is deformed in the space between the upper and lower connection terminals 211d and 212d. As a result, the upper connection terminal 211d is brought into contact with the lower connection terminal 212d, and therefore, the electrical conduction is achieved (ON state).

Figure 13:
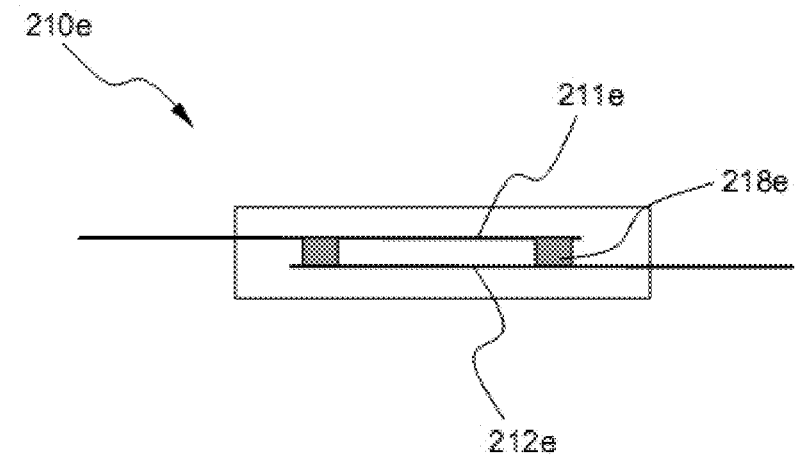
FIGS. 13 and 14 are sectional views typically illustrating the operation of an exemplary mechanical connection sensor (e) that can be used in the present invention.
Figure 14:
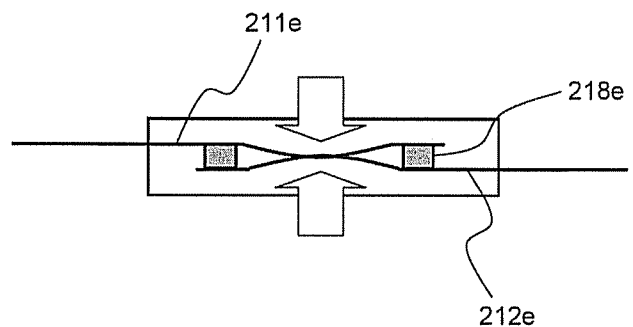

Referring to FIGS. 13 and 14, a mechanical connection sensor 210e is constructed in a structure in which two insulators 218e are mounted between upper and lower connection terminals 211e and 212e such that the insulators 218e are spaced apart from each other. However, a mechanical connection sensor 210e is different from the mechanical connection sensor 210d of FIG. 11 in that upper and lower connection terminal 211e and 212e are made of a material that can be deformed. This mechanical connection sensor 210e may be preferable in a structure in which the mechanical connection sensor 210e is mounted between two battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery having the safety device according to the present invention has effects in that, when the volume of the battery is increased due to the abnormal response of the battery, and therefore, excessive pressure is applied to an apparatus adjacent to the battery, the safety device detects the pressure and forcibly discharges the battery, thereby discharging energy accumulated in the battery to the outside with the result that fire or explosion of the secondary battery is prevented, and the safe use of the secondary battery is accomplished. Consequently, the present invention is widely and effectively applicable to a secondary battery industry requiring high safety.

What is claimed is:

1. A secondary battery, comprising:
   a prismatic or pouch-shaped battery cell having a cathode and an anode;
   two or more mechanical connection sensors fixed to an outer surface of the prismatic or pouch-shaped battery cell, wherein the two or more mechanical sensors are connected in parallel with each other, and wherein the two or more mechanical connection sensors are in an OFF state unless the battery cell swells to a critical value or more thereby turning at least one of the two or more mechanical sensors into an ON state wherein electrical energy accumulated in the battery cell is conducted through a sensor in the ON state; and
   a resistor electrically connected in series with the two or more mechanical connection sensors and between the anode and the cathode of the battery cell, wherein the resistor has a predetermined resistance value,
   whereby when the battery cell swells to the critical value or more due to abnormal operation of the battery cell, at least one of the two or more mechanical connection sensors is turned into the ON state and conducts electrical energy accumulated in the battery cell to the resistor where the electrical energy is consumed, and
   wherein each of the mechanical connection sensors has two connection terminals spaced vertically apart from each other and mounted in a pressure-sensitive sheath, and an elastic member mounted between the connection terminals.

2. The secondary battery according to claim 1, further comprising:
   an insulative pouch-shaped battery case including a metal layer and a resin layer, wherein the anode and the cathode are mounted in the battery case.

3. The secondary battery according to claim 1, wherein one end of the elastic member is fixed to the pressure-sensitive sheath, and one of the connection terminals is elastically supported by the other end of the elastic member.

4. The secondary battery according to claim 1, wherein one of the connection terminals has one or more protruding connection ends, and the two connection terminals are elastically supported by the elastic member, which is disposed between the connection terminals.

5. The secondary battery according to claim 1, wherein the connection terminals are spaced apart from each other by a film-shaped insulative member disposed between the connection terminals, at least one of the connection terminals is provided with a conductive piercing member for piercing the insulative member and connecting with the other connection terminal when an external force (a swelling force of the battery cell) is applied to the at least one of the connection terminals.

6. The secondary battery according to claim 1, wherein at least one of the connection terminals is formed of a material or a shape that can be deformed due to an external force, and at least two insulators are mounted between the two connection terminals such that the at least two insulators are spaced apart from each other.

7. The secondary battery according to claim 1, wherein the resistor is constructed to consume energy through heat generation during the conduction.

8. The secondary battery according to claim 7, wherein the predetermined resistance value is such that the total capacity of the battery cell is discharged within 10 seconds to 10 hours.

9. A battery pack including secondary batteries according to claim 1.

10. The battery pack according to claim 9, wherein the two or more mechanical connection sensors of each secondary battery are mounted between the outer surfaces of the neighboring secondary batteries as unit cells.

* * * * *